United States Patent [19]

Weaver

[11] 4,301,586
[45] * Nov. 24, 1981

[54] METHOD OF MAKING A VALVE CONSTRUCTION HAVING MULTIPLE PISTON MEANS

[75] Inventor: Marvin P. Weaver, Knoxville, Tenn.

[73] Assignee: Robertshaw Controls Company, Richmond, Va.

[*] Notice: The portion of the term of this patent subsequent to Oct. 21, 1997, has been disclaimed.

[21] Appl. No.: 141,336

[22] Filed: Apr. 18, 1980

Related U.S. Application Data

[62] Division of Ser. No. 911,403, Jun. 1, 1978, Pat. No. 4,228,817.

[51] Int. Cl.³ .................. B23P 15/00; F16K 27/04
[52] U.S. Cl. ............................................. 29/157.1 R
[58] Field of Search ............... 29/157.1 R; 137/79, 137/595, 601, 607, 636, 636.1, 636.2, 636.3, 636.4, 892

[56] References Cited

U.S. PATENT DOCUMENTS

| | | | |
|---|---|---|---|
| 3,364,942 | 1/1968 | Ney et al. | 137/595 |
| 3,960,124 | 6/1976 | Payne | 137/554 |
| 3,972,472 | 8/1976 | Kawabata | 137/595 |
| 3,989,058 | 11/1976 | Jackson | 137/269 |

Primary Examiner—Daniel C. Crane
Attorney, Agent, or Firm—Candor, Candor & Tassone

[57] ABSTRACT

A valve construction having a housing provided with a chamber and ports leading to the chamber and having an axially movable piston unit disposed in the chamber to interconnect certain of the ports together in relation to the axial position of the piston unit that is caused by a condition responsive device operatively associated with the piston unit, the piston unit comprising a plurality of pistons disposed in spaced parallel relation and being secured together to be axially moved in unison in the chamber under the influence of the condition responsive device.

14 Claims, 8 Drawing Figures

METHOD OF MAKING A VALVE CONSTRUCTION HAVING MULTIPLE PISTON MEANS

CROSS-REFERENCE TO RELATED PATENT APPLICATION

This application is a divisional patent application of its copending parent patent application, Ser. No. 911,403, filed June 1, 1978, now U.S. Pat. No. 4,228,817.

BACKGROUND OF THE INVENTION

1. Field of the Invention

This invention relates to an improved condition responsive valve construction and method of making the same.

2. Prior Art Statement

It is known to provide a valve construction having a housing means provided with a chamber and port means leading to the chamber and having an axially movable piston means disposed in the chamber to interconnect certain of the port means together in relation to the axial position of the piston means that is caused by a condition responsive device operatively associated with the piston means.

For example, see the following four U.S. patents:
(1) U.S. Pat. No. 3,989,058—Jackson et al
(2) U.S. Pat. No. 3,960,124—Payne
(3) U.S. Pat. No. 3,972,472—Kawabata (4) U.S. Pat. No. 3,364,942—Ney et al.

It appers that the valve construction of item (1) above has an axially movable piston member which through the length thereof can control various sets of ports in the housing means carrying the piston member, the piston member being operated by a piston and cylinder temperature responsive device operatively interconnected to one end of the piston member.

Similarly, the valve construction of item (2) above has a piston member for controlling port means of a housing means, the piston member of item (2) above carrying axially spaced flexible O-rings in annular grooves thereof to provide the sealing functions between certain ports thereof whereas the housing means of item (1) above has such O-rings being carried thereby to operate on various lands of the piston member.

It appears that the valve construction of item (3) above has a single disc-like piston member acting against a plurality of non-attached piston-like valve stems carried respectively by a plurality of piston-like valve members that control separate sets of port means of a housing means in response to sensed temperature of a temperature responsive device interconnected to the disc-like piston member.

SUMMARY OF THE INVENTION

It is a feature of this invention to provide a valve construction with a unique piston arrangement so that multiple port control can be provided thereby while maintaining the overall length of the valve construction relatively short.

In particular, one embodiment of this invention provides a valve construction having a housing means provided with a chamber and port means leading to the chamber and having an axially movable piston means disposed in the chamber to interconnect certain of the port means together in relation to the axial position of the piston means that is caused by a condition responsive device operatively associated with the piston means, the piston means comprising a plurality of pistons disposed in spaced parallel relation and being secured together to be axially moved in unison in the chamber under the influence of the condition responsive means.

Each piston of the piston means of this invention is adapted to control the interconnection of certain of the port means independently of the remainder of the pistons.

It appears that the valve construction of item (4) above has a pair of piston-like valve members disposed for parallel axial movement in a housing, the piston valve members having adjacent ends thereof interconnected together outboard of the housing means receiving the same.

In one embodiment of this invention, each of the pistons is adapted to change the interconnection of its respective port means at the same sensed condition of the condition responsive device that causes the remainder of the pistons to change its respective port interconnection.

In another embodiment of this invention, each piston is adapted to change the interconnection of its respective port means at a sensed condition of the condition responsive device different than the sensed condition thereof that causes the remainder of the pistons to change its respective port interconnection.

Accordingly, it is an object of this invention to provide an improved valve construction having one or more of the novel features of this invention as set forth above or hereinafter shown or described.

Another object of this invention is to provide a method of making such a valve construction or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
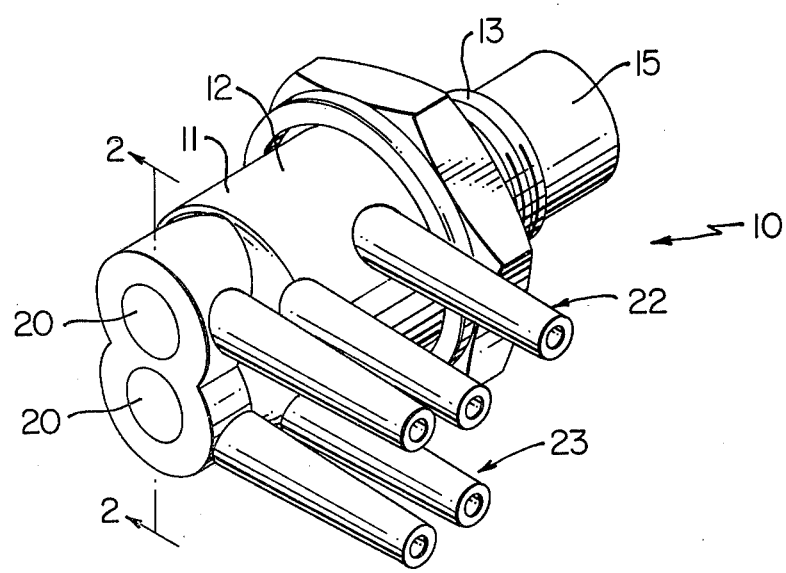
FIG. 1 is a perspective view of one embodiment of the valve construction of this invention.

While the various features of this invention are hereinafter described and illustrated as being particularly adapted to provide temperature operated valve constructions, it is to be understood that the various features of this invention can be utilized singly or in any combination thereof to be responsive to other conditions as desired.

Therefore, this invention is not to be limited to only the embodiments illustrated in the drawings, because the drawings are merely utilized to illustrate one of the wide variety of uses of this invention.

Figure 2:
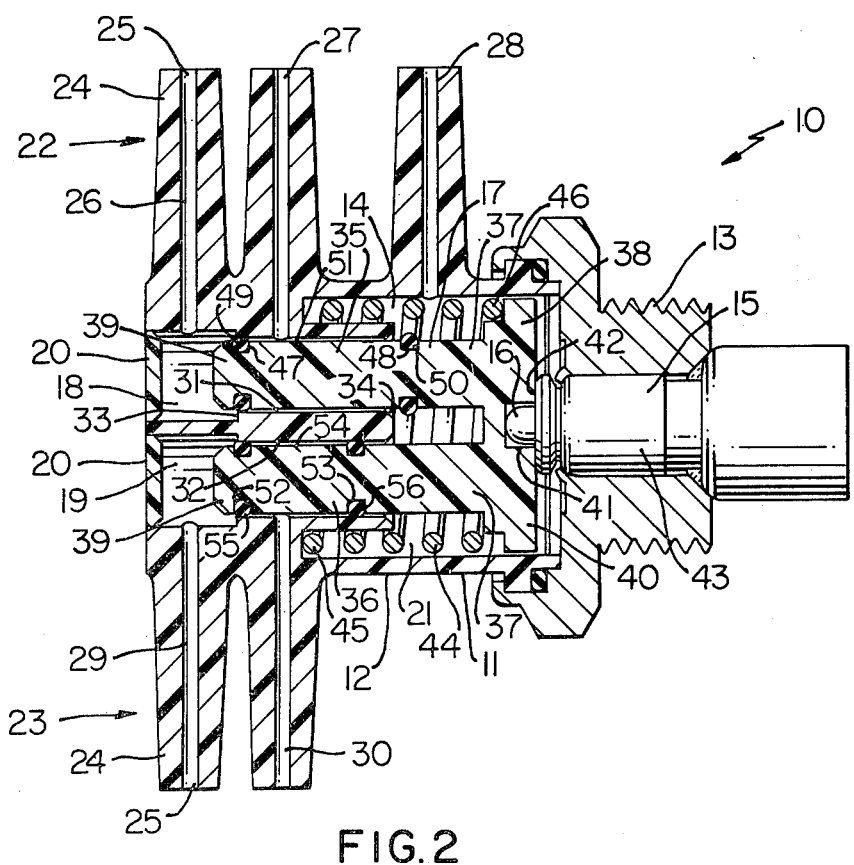
FIG. 2 is an enlarged cross-sectional view taken on line 2—2 of FIG. 1 and illustrates the two rows of ports being disposed 180° apart rather than parallel as illustrated in FIG. 1.

Referring now to FIGS. 1 and 2, an improved valve construction of this invention is generally indicated by the reference numeral 10 and comprises a housing means 11 formed from two parts 12 and 13 suitably secured together to define a chamber 14 within the housing member 12 and carrying a conventional piston and cylinder temperature responsive device 15 by the housing member 13 whereby a piston member 16 of the temperature responsive device 15 is adapted to project into the chamber 14 and control the position of a piston means 17 disposed for axial movement therein in a manner hereinafter set forth.

The chamber 14 of the housing means 11 has two cylindrical sections 18 and 19 disposed spaced and parallel to each other and respectively having their left hand ends in FIG. 2 closed by suitable plugs 20 while the right hand ends thereof in FIG. 2 are adapted to be respectively disposed in fluid communication with a main part 21 of the chamber 14 as illustrated.

The housing member 12 has two rows or sets 22 and 23 of outwardly directed nipple means 24 each of which has a port means 25 passing therethrough and intersecting with the chamber 14.

In particular, the row or set 22 of port means 25 comprises three ports 26, 27 and 28 with the ports 26 and 27 respectively intersecting with the section 18 of the chamber 14 while the port 28 intersects with the main part 21 thereof.

The row or set 23 of port means 25 has two ports 29 and 30 respectively intersecting with the section 19 of the chamber 14.

The housing member 12 has an inwardly stepped cylindrical valve seat section 31 in the chamber section 18 and has a similar inwardly stepped valve seat section 32 in the chamber section 19, the valve seat lengths or sections 31 and 32 respectively having opposed ends or shoulders 33 and 34 for a purpose hereinafter described.

The ports 27 and 30 respectively interrupt the valve seat sections 31 and 32 intermediate their ends 33 and 34 thereof for a purpose hereinafter described.

The piston means 17 of this invention comprises a one-piece structure formed of any suitable material having two cylindrical pistons 35 and 36 disposed in spaced parallel relation and respectively integrally interconnected together at their ends 37 to a plate-like part 38 while their other ends 39 are disposed in free cantilevered form remote from the plate means 38, the piston members 35 and 36 being adapted to be respectively received in the sections 18 and 19 of the chamber 14 as illustrated while the plate means 38 is disposed in the main part 21 of the chamber 14.

The plate means 38 is interrupted at the side 40 thereof by an opening 41 that is adapted to receive the piston 16 of the temperature responsive device 15 therein while an end surface 42 of a cylinder part 43 of the device 15 is adapted to abut against the surface 40 of the plate means 38 of the piston means 17 when the piston means 17 has caused substantially a full retraction of the piston member 16 within the housing held cylinder 43 of the device 15 under the force of a compression spring 44 that is disposed in the main part 21 of the chamber 14 and has one end 45 bearing against the housing member 12 and the other end 46 thereof bearing against the plate means 38 to tend to move the piston means 17 to the right in FIG. 2.

The piston 35 has a pair of spaced annular grooves 47 and 48 formed therein and respectively receiving annular resilient O-ring-like members 49 and 50 which project outwardly beyond the outer peripheral cylindrical surface 51 of the piston 35 in such a manner that when the O-ring member 49 or 50 is received in the valve seat section 31 of the chamber section 18, the particular O-ring member 49 or 50 will seal against the same completely around the piston 35 for a valving purpose hereinafter described.

Similarly, the piston 36 has a pair of axially spaced annular grooves 52 and 53 formed in the outer peripheral cylindrical surface 54 thereof and respectively receiving annular resilient O-ring-like members 55 and 56 which are respectively adapted to seal completely around the piston 36 against the valve seat section 32 of the chamber section 19 when disposed therein for a valving purpose hereinafter described.

The temperature responsive device 15 is conventional in the art and the same contains a wax charge or the like which expands upon the sensing of a certain temperature to force the piston 16 outwardly relative to the housing held cylinder member 43 and when cooled below that certain temperature, the wax charge contracts to permit the piston 16 to be retracted into the cylinder member 43, such as by the force of the compression spring 44, whereby the temperature sensed by the device 15 determines the position of the piston means 17 relative to the housing means 11 and, thus, determines the interconnection of the port means 25 by the pistons 35 and 36 in a manner now to be described.

In the embodiment of the valve construction 10 of this invention illustrated in FIG. 2, the sealing members 49, 50 and 55, 56 are so arranged on their respective pistons 35 and 36 that when the device 15 is sensing a temperature which permits the piston 16 to be fully retracted into the cylinder 43 as illustrated in FIG. 2, the sealing member 49 of the piston 35 is sealing against the valve seat section 31 intermediate the ports 26 and 27 while the sealing member 50 is spaced from the end 34 of the valve seat section 31 so that port 28 is disposed in fluid communication with the port 27.

Under such conditions of the temperature responsive device 15, the sealing members 55 and 56 of the piston 36 are disposed in sealing engagement against the valve seat section 32 with the sealing member 55 being disposed intermediate the ports 29 and 30 so that the ports 29 and 30 are sealed from each other and the port 30 is sealed from the port 28 because the sealing member 56 is disposed intermediate the port 30 and the end 34 of the valve seat section 32.

However, when the temperature sensed by the device 15 increases to a particular temperature thereof so that the wax charge therein expands to force the piston 16 to the left in FIG. 2 out of the held cylinder 43 to move the piston means 17 axially to the left in FIG. 2 in opposition to the force of the compression spring 44, the sealing member 49 is moved to the left beyond the end 33 of the valve seat section 31 to disconnect the ports 27 and 28 from each other. At the same time, the sealing member 55 of the piston 36 is moved to the left beyond the end 33 of the valve seat section 32 to now fluidly interconnect the ports 29 and 30 together, the sealing member 56 still remaining in sealing contact with the valve seat section 32 intermediate the ports 30 and 28 so that the port 28 is never fluidly interconnected to the port 30.

In this manner, it can be seen that the chamber section 19 of the valve construction 10 is being utilized as a two port, normally closed valve while the chamber section 18 of the valve construction 10 is being utilized as a three port switching valve with the center port 27 and the end port 28 being common when the device 15 is cold and switching to have the ports 26 and 27 common when the device 15 is hot.

When the device 15 subsequently cools to permit the piston 16 to retract into the cylinder 43 in the manner illustrated in FIG. 2 under the force of the compression spring 44, the piston 35 disconnects the port 26 from the port 27 while interconnecting the port 27 to the port 28 and the piston 36 disconnects the ports 29 and 30 from each other.

Therefore, it can be seen that the valve construction 10 as illustrated in FIGS. 1 and 2 is adapted to provide two different switching functions wherein the operation of the chamber sections 18 and 19 are independent from each other so that the overall length of the valve construction 10 is relatively short when compared with devices that attempt to accomplish the same switching functions by a single piston member.

While the valve construction 10 has been previously described as having the switching function for the row 22 of ports 25 occurring at the same sensed temperature that the switching function for the row 23 of ports 25 is taking place, it is to be understood that the switching for the row 22 of ports 25 could take place at a different sensed temperature than the switching for the row 23 of ports 25 by merely forming one or more of the annular grooves 47, 48, 52 and 53 for the pistons 35 and 36 in different axial postions.

Figure 3:
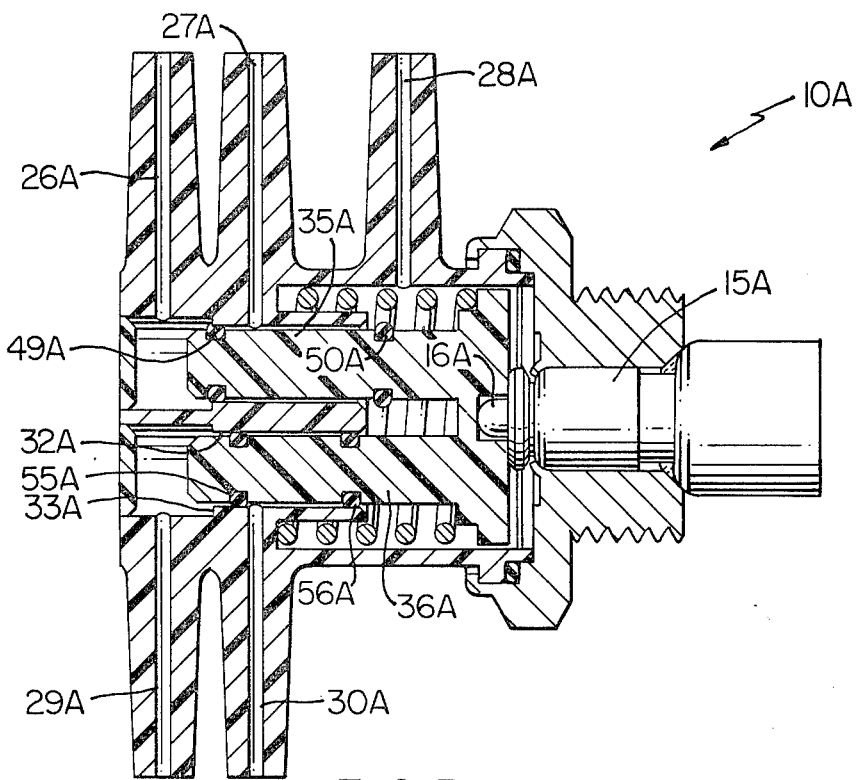
FIG. 3 is a view similar to FIG. 2 and illustrates another embodiment of the valve construction of this invention.

For example, reference is now made to FIG. 3 wherein another embodiment of the valve construction of this invention is generally indicated by the reference numeral 10A and parts thereof that are similar to the valve construction 10 previously described are indicated by like reference numerals followed by the reference letter "A".

As illustrated in FIG. 3, the sealing members 49A and 50A of the piston 35A are in the same location as the piston 35 previously described while the sealing members 55A and 56A for the piston 36A are located further to the right than the sealing members 55 and 56 of the piston member 36.

In this manner, the piston 35A will cause its switching function for the ports 26A, 27A and 28A at the same temperature that the piston 35 performed its switching function as previously described, but at that time the sealing member 55A of the piston 36A is still disposed in sealing engagement against the valve seat section 32A so that the ports 29A and 30A are still disconnected from each other. However, upon a further increase in the temperature sensed by the device 15A, the piston means 17A is further moved to the left in FIG. 3 by the extending piston 16A so that at a certain higher sensed temperature, the sealing member 55A is moved to the left beyond the end 33A of the valve seat section 32A to interconnect the ports 29A and 30A together while the sealing member 56A still remains in sealing contact with the valve seat surface 32A intermediate the ports 30A and 28A.

Thus, it can be seen that the valve construction 10A performs the switching function for the piston 35A at a lower temperature than the temperature that causes a switching function for the piston 36A.

Obviously, the pistons 35A and 36A could have the sealing members 49A, 50A and 55A, 56A arranged in such a manner that the piston 36A will perform its switching function at a lower temperature than the temperature that will cause the piston 35A to perform its switching function.

Also, it is to be understood that the valve construction 10 of this invention could be utilized to have both cavaties or chamber sections 18 and 19 thereof utilized as three port switching valves so that the port 28 would be common to both sections 18 and 19 when the temperature sensing device 15 is cold or sensing a temperature below the switching temperature thereof, the two chamber sections 18 and 19 switching at the same temperature or at different temperatures as desired.

Figure 4:
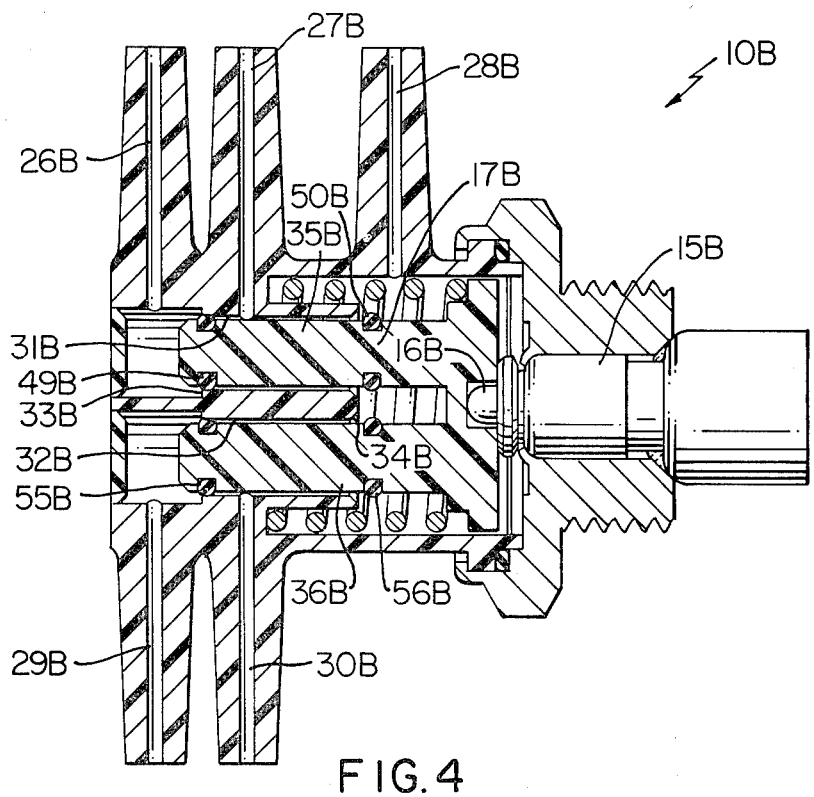
FIG. 4 is a view similar to FIG. 2 and illustrates another embodiment of the valve construction of this invention.

In particular, reference is now made to FIG. 4 wherein another valve construction of this invention is generally indicated by the reference numeral 10B and parts thereof similar to the valve construction 10 previously described are indicated by like reference numerals followed by the reference letter "B".

As illustrated in FIG. 4, the valve construction 10B is substantially identical to the valve construction 10 previously described as the only difference between the valve constructions 10 and 10B is that the sealing member 56B for the piston 36B has been moved to the right to such a position that when the device 15B is sensing a temperature below the actuating temperature thereof, the sealing member 56B is to the right beyond the end 34B of the valve seat section 32B so that the port 28B is disposed in fluid communication with the port 30B as well as in fluid communication with the port 27B.

However, when the device 15B senses a certain temperature to extend the piston 16B to the left in FIG. 4 and move the piston means 17B to the left so that the sealing members 50B and 56B respectively seal against the valve seat sections 31B and 32B to disconnect the port 28B from the ports 27B and 30B, the sealing members 49B and 55B have been moved to the left beyond the ends 33B of the valve seat sections 31B and 32B to permit the ports 27B and 30B to be respectively interconnected to the ports 26B and 29B as previously described.

While the pistons 35B and 36B of FIG. 4 have been illustrated and described as switching at the same temperature, it is to be understood that the same could switch at different temperatures with the piston 35B switching at a lower temperature than the piston 36B or with the piston 36B switching at a temperature lower than the piston 35B by merely having the sealing members of the respective pistons 35B and 36B rearranged thereon as previously described.

Figure 5:
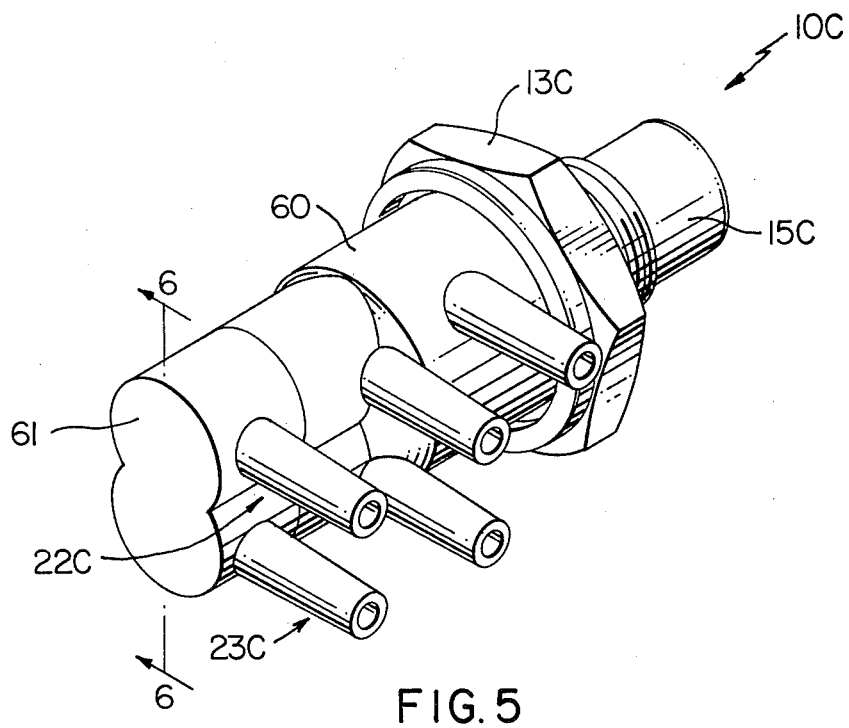
FIG. 5 is a perspective view illustrating another embodiment of the valve construction of this invention.
Figure 6:
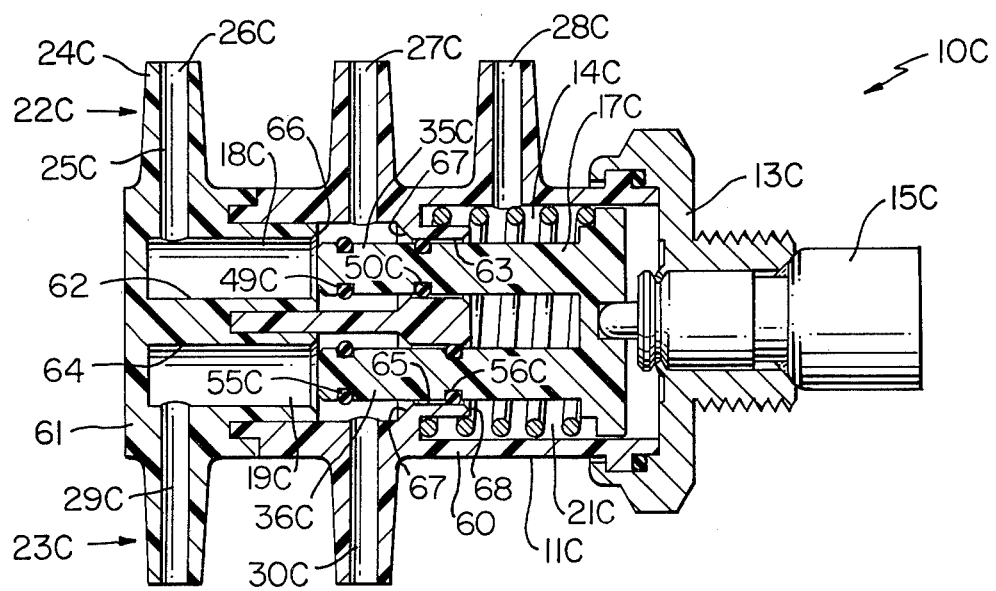
FIG. 6 is an enlarged cross-sectional view taken in line 6—6 of FIG. 5 with the two rows of ports thereof being shown approximately 180° apart rather than parallel as in FIG. 5.

Another valve construction of this invention is generally indicated by the reference numeral 10C in FIGS. 5 and 6 and parts thereof that are similar to the valve construction 10 previously described are indicated by like reference numerals followed by the reference letter "C".

While the valve construction 10C has a housing means 11C, a temperature sensing device 15C, an axially movable piston means 17C formed of two piston members 35C and 36C respectively movable in chamber sections 18C and 19C similar to the valve construction 10 previously described, the housing means 11C is formed from the housing part 13C and two other housing members 60 and 61 suitably secured together and cooperating together to define the chamber 14C as well as the two rows or sets 22C and 23C of nipple means 24C and port means 25C previously described.

However, the housing members 60 and 61 respectively define inwardly directed annular elongated and axially spaced valve seat surfaces or sections 62 and 63 in the chamber section 18C and similar inwardly directed annular valve seat surfaces or sections 64 and 65 in the chamber section 19C, the ends 66 of the valve seat sections 62 and 64 being respectively axially spaced from adjacent ends 67 of the valve seat surfaces 63 and 65 which have other ends 68 terminating in the main part 21C of the chamber 14C.

The ports 26C and 20C respectively intersect the valve seat sections 62 and 64 and the ports 27C and 30C respectively intersect the chamber sections 18C and 19C intermediate the valve seat sections 62, 63 and 64, 65 while the port 28C intersects the main part 21C of the chamber 14C.

The annular sealing members 49C and 50C for the piston 35C are so arranged that when the device 15C is in its fully collapsed temperature sensing condition as illustrated in FIG. 6, the sealing member 49C is spaced to the right from the end 66 of the valve seat surface 62 so that the ports 26C and 27C are fluidly interconnected together while the sealing member 50C seals against the valve seat surface 63 to prevent fluid communication between the ports 27C and 28C.

Similarly, the sealing members 55C and 56C of the piston member 36C are so positioned when the device 15C is in the cold condition illustrated in FIG. 6 that the sealing member 55C is spaced to the right from the end 56 of the valve seat 64 so that the ports 29C and 30C are fluidly interconnected together and the sealing member 56C prevents fluid communication between the port 30C and the port 28C.

However, when the temperature sensing device 15C senses a certain temperature to cause the piston 15C to move to the left in FIG. 6 a certain distance to move the piston means 17C so that the sealing members 49C and 55C respectively seal against the valve seat surfaces 62 and 64, fluid communication between the ports 26C and 27C is terminated as well as between the ports 29C and 30C. At this time, the sealing member 50C has been moved to the left beyond the end 67 of the valve seat surface 63 so that the port 28C is now interconnected to the port 27C. However, at this time, the sealing member 56C is still in sealing engagement with the valve seat surface 65 so that the 30D is still blocked from the port 28D.

As previously stated, by merely rearranging the one or more of the sealing members 49C, 50C 55C and 56C on their respective piston means 35C and 36C, the upper row 26C of ports 25C can be switched at a different temperature from the switching temperature for the lower row 23C of port 25C.

Figure 7:
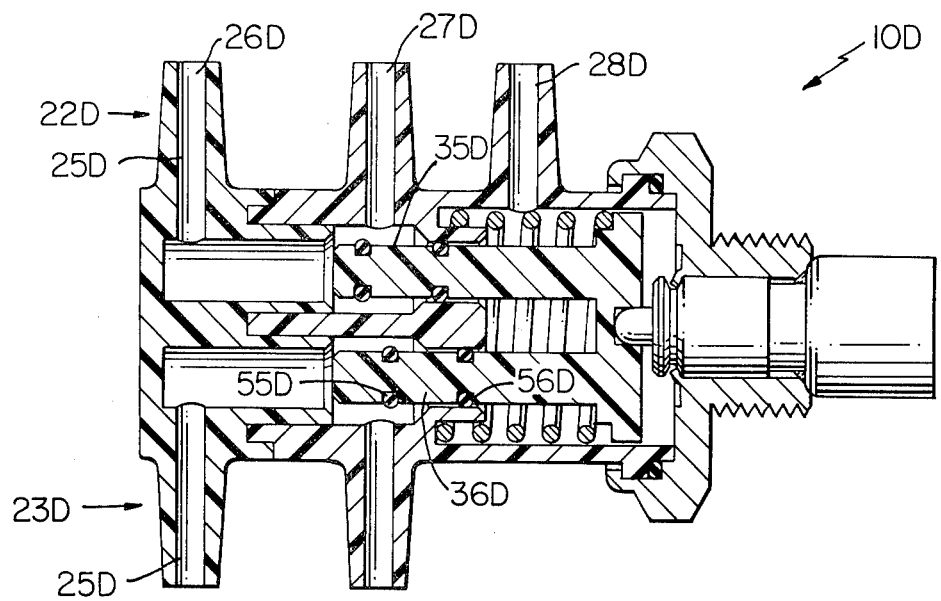
FIG. 7 is a view similar to FIG. 6 and illustrates another embodiment of the valve construction of this invention.

For example, the valve construction 10D in FIG. 7 is substantially identical to the valve construction 10C previously described whereby like parts are indicated by like reference numerals followed by the reference letter "D".

However, the sealing members 55D and 56D have been moved further to the right on the piston 36D so that the piston member 36D switches at a higher temperature than the piston 35D.

Accordingly, it can be seen that in the valve constructions 10C and 10D of FIGS. 6 and 7, the row or set 23C or 23D or ports 25C or 25D can be utilized as a two port normally opened valve while the row 22C or 22D is used as a three port switching valve with the ports 26C or 26D and 27D or 27C being common when the valve is cold and switching to have the port 28C or 28D common to the port 27C or 27D when the valve is hot.

As shown by the valve construction 10D, the rows 22D and 23D of ports 25D can be switched at the same temperature or different temperatures as desired.

Also, the valve construction 10C can be used as two three port switching valves having the port 28C common to both sides or chamber sections 18C and 19C when the valve is hot and they can be switched at the same temperature or different temperatures as desired.

Figure 8:
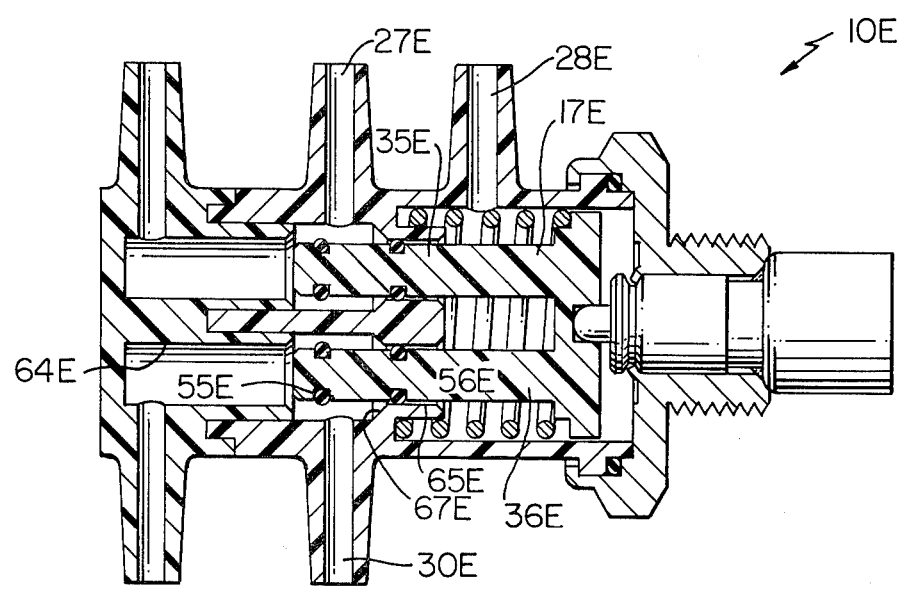
FIG. 8 is a view similar to FIG. 6 and illustrates another embodiment of the valve construction of this invention.

For example, reference is now made to FIG. 8 wherein another valve construction of this invention is generally indicated by the reference numeral 10E and parts thereof similar to the valve construction 10C previously described are indicated by like reference numerals followed by the reference letter "E".

As illustrated in FIG. 8, the sealing member 56E is spaced further to the left than the valve member 56C of FIG. 6 so that when the piston 36E is moved to the left in FIG. 8 to close the sealing member 55E against the valve seat surface 64E, the sealing member 56E is spaced to the left beyond the end 67E of the valve seat surface 65E so that the port 28E is now common to the port 30E as well as to the port 27E because the piston member 35E has also accomplished its switching function at this time.

Of course, the piston means 17E can be changed so that the same will switch the piston members 35E and 36E at different sensed temperatures in the manner previously described.

Therefore, it can be seen that this invention provides a valve construction having a piston means comprising a plurality of piston members disposed in spaced parallel relation and being secured together to move in unison in response to a condition sensed by a condition responsive device so that the overall length of the valve construction of this invention is relatively short when compared with conventional valve constructions that accomplish the same number of switching operations.

While the forms and methods of this invention now preferred have been illustrated and described as required by the Patent Statute, it is to be understood that other forms and method steps can be utilized and still fall within the scope of the appended claims.

What is claimed is:

1. In a method of making a valve construction having a housing means provided with a chamber and port means leading to said chamber and having an axially movable piston means disposed in said chamber to interconnect certain of said port means together in relation to the axial position of said piston means that is caused by a condition responsive device and a spring means operatively associated with said piston means, the improvement comprising the steps of forming said piston means to comprise a plurality of pistons disposed in spaced parallel relation and being secured together to be axially moved in unison in said chamber under the influence of said condition responsive device, disposing a single coiled compression spring in said chamber, and telescoping said spring over all of said pistons so that all of said pistons are axially disposed inside said spring.

2. A method as set forth in claim 1 and including the step of forming each of said pistons to be adapted to control the interconnection of certain of said port means independently of the remainder of said pistons.

3. A method as set forth in claim 2 and including the step of forming each of said pistons to be adapted to change the interconnection of its respective certain port means at the same sensed condition of said condition responsive device that causes said remainder of said pistons to change its respective interconnection.

4. A method as set forth in claim 2 and including the step of forming each of said pistons to be adapted to change the interconnection of its respective certain port means at a sensed condition of said condition responsive device different than the sensed condition thereof that causes said remainder of said pistons to change its respective interconnection.

5. A method as set forth in claim 1 and including the step of forming said piston means to comprise a one-piece member having said pistons integral with one side of a plate means disposed at one end of said pistons.

6. A method as set forth in claim 5 and including the step of forming said condition responsive device to have a movable part disposed in engagement with the other side of said plate means during at least part of the axial movement of said piston means by said condition responsive device.

7. A method as set forth in claim 6 said step of disposing said spring in said housing means comprises the step of disposing one end of said spring to bear against said plate means to tend to axially move said piston means in one direction relative to said housing means.

8. A method as set forth in claim 1 and including the steps of forming said chamber to have a plurality of sections respectively receiving part of said pistons therein, and forming each section to have certain of said port means interconnecting therewith whereby each piston part controls the port means of its respective section independently of the remainder of said pistons.

9. A method as set forth in claim 8 and including the steps of forming said chamber with a part thereof that is disposed in communication with said sections, and forming one of said port means to interconnect with said part of said chamber.

10. A method as set forth in claim 9 and including the step of forming each section to have at least two port means interconnecting therewith.

11. A method as set forth in claim 7 and including the step of disposing said spring so that said pistons each has its longitudinal axis disposed substantially parallel to the longitudinal axis of said spring.

12. A method as set forth in claim 11 and including the step of forming said port means to be disposed in a plurality of rows thereof that are substantially parallel to each other.

13. A method as set forth in claim 12 and including the step of forming each row of said port means to be disposed substantially transverse to said longitudinal axis of its respective piston.

14. A method as set forth in claim 13 and including the steps of forming said housing means with a plurality of nipple means extending therefrom, and interconnecting said port means respectively with said nipple means.

* * * * *